US012726372B2

(12) United States Patent
Xu

(10) Patent No.: US 12,726,372 B2
(45) Date of Patent: Sep. 1, 2026

(54) NETWORK CHIP MANAGEMENT METHOD AND APPARATUS, COMMUNICATION DEVICE, AND STORAGE MEDIUM

(71) Applicant: HUAWEI TECHNOLOGIES CO., LTD., Shenzhen (CN)

(72) Inventor: Xiaodong Xu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 602 days.

(21) Appl. No.: 18/176,568

(22) Filed: Mar. 1, 2023

(65) Prior Publication Data

US 2023/0283490 A1 Sep. 7, 2023

(30) Foreign Application Priority Data

Mar. 2, 2022 (CN) ........................ 202210200046.2

(51) Int. Cl.
*H04L 12/12* (2006.01)
*H04L 41/0681* (2022.01)
*H04L 49/109* (2022.01)

(52) U.S. Cl.
CPC .......... *H04L 12/12* (2013.01); *H04L 41/0681* (2013.01); *H04L 49/109* (2013.01)

(58) Field of Classification Search
CPC ...................................................... H04L 12/12
See application file for complete search history.

(56) References Cited

U.S. PATENT DOCUMENTS 10,268,262 B2 * 4/2019 Khatri .................. G06F 1/3234
10,921,874 B2 * 2/2021 Ehmann ................. G06F 1/324
11,452,000 B2 * 9/2022 Liu .......................... H04L 5/00
11,804,928 B2 * 10/2023 Tang .................... H04L 1/1825
2009/0307509 A1 * 12/2009 Jenne .................. G06F 1/3203 713/300

(Continued)

FOREIGN PATENT DOCUMENTS

CN 106776425 B * 11/2019 ......... G06F 13/4068
CN 113132272 A 7/2021

(Continued)

OTHER PUBLICATIONS

Somayeh Sadeghi Kohan et al: "Stress Aware Periodic Test of Interconnects." Jan. 4, 2022, doi: 10.1007/S10836-021-05979-5, total 14 pages.

(Continued)

*Primary Examiner* — Guang W Li

(57) ABSTRACT

The technology of this application relates to a network chip management method. In the method, resource requirement information of a current network for a network chip is determined based on one or more of port information, configuration information, and traffic information of the network chip. A target operating frequency of the network chip is determined based on the resource requirement information. The network chip is controlled to operate at the target operating frequency. In this way, an operating frequency of the network chip adapts to the current network, so that power consumption of the network chip can be dynamically adjusted based on the current network, and the power consumption of the network chip is reduced while a network requirement is met.

20 Claims, 3 Drawing Sheets

(56) References Cited

U.S. PATENT DOCUMENTS

| | | | | |
|---|---|---|---|---|
| 2012/0124402 | A1* | 5/2012 | Vanderwiel | G06F 1/3215 713/320 |
| 2014/0181546 | A1* | 6/2014 | Hallberg | G06F 1/3206 361/87 |
| 2014/0289545 | A1* | 9/2014 | Noro | G06F 1/32 713/322 |
| 2016/0285640 | A1* | 9/2016 | Kapur | H04L 43/0894 |
| 2017/0031431 | A1 | 2/2017 | Khatri et al. | |
| 2018/0210531 | A1* | 7/2018 | Shahneous Bari | G06F 3/0679 |
| 2018/0210532 | A1* | 7/2018 | Zhang | G06F 1/324 |
| 2020/0073457 | A1* | 3/2020 | Aden | H04L 12/10 |
| 2020/0401093 | A1* | 12/2020 | Song | G06F 16/2471 |
| 2022/0404895 | A1* | 12/2022 | Naito | G06F 1/06 |
| 2023/0083604 | A1* | 3/2023 | Arai | G06F 9/50 718/1 |

FOREIGN PATENT DOCUMENTS

| | | | | |
|---|---|---|---|---|
| CN | 113132272 B * | 2/2023 | | H04L 49/30 |
| WO | 2019153187 A1 | 8/2019 | | |

OTHER PUBLICATIONS

S. Zhao, I. Ahmed, C. Lamoureux, A. Lotfi, V. Betz and O. Trescases, “A universal self-calibrating Dynamic Voltage and Frequency Scaling (DVFS) scheme with thermal compensation for energy savings in FPGAs,” 2016 IEEE Applied Power Electronics Conference and Exposition (APEC), Long Beach, CA, USA, Mar. 20-24, 2016, pp. 1882-1887, doi: 10.1109/APEC.2016.7468125.

European Patent Office Communication for EP Application No. 23159615.6 dated Jul. 9, 2024, 9 pages.

European Search Report for EP Application No. 23159615.6 dated Jul. 31, 2023, 11 pages.

Kaxiras Stefanos et al: “Computer Architecture Techniques for PowerEfficiency” In: “Computer Architecture Techniques for Power-Efficiency”, Jun. 25, 2008 (Jun. 25, 2008), Springer International Publishing, 2008,XP093250506, ISBN: 978-3-031-00593-0, pp. 41-44.

Anonymous: “Power management”,Wikipedia, Jun. 23, 2021 (Jun. 23, 2021), pp. 1-5, XP093251781.

* cited by examiner

Determining module

601

Control module

602

NETWORK CHIP MANAGEMENT METHOD AND APPARATUS, COMMUNICATION DEVICE, AND STORAGE MEDIUM

CROSS-REFERENCE TO RELATED APPLICATIONS

This application claims priority to Chinese Patent Application No. 202210200046.2, filed on Mar. 2, 2022, which is hereby incorporated by reference in its entirety.

TECHNICAL FIELD

This disclosure relates to the field of communication technologies, and in particular, to a network chip management method and apparatus, a communication device, and a storage medium.

BACKGROUND

Communication devices, such as a router and a switch, include service boards. The service board is configured to receive and send a packet.

A network chip is used for receiving and sending the packet on the service board. During running of a current network, some network chips on the service board are not fully used.

However, power consumption of the network chip that is not fully used is still very high.

SUMMARY

This disclosure provides a network chip management method and apparatus, a communication device, and a storage medium. According to the method, power consumption of a network chip can be dynamically adjusted based on a current network, so that the power consumption of the network chip is reduced while a network requirement is met. The following describes technical solutions provided in this disclosure.

According to a first aspect, this disclosure provides a network chip management method, where the method is applied to a communication device, the communication device has a service board, the service board has a network chip, and the method includes: determining resource requirement information of a current network for the network chip based on one or more of port information, configuration information, and traffic information of the network chip; determining a target operating frequency of the network chip based on the resource requirement information; and controlling the network chip to operate at the target operating frequency.

According to a technical solution provided in this disclosure, the resource requirement information of the current network for the network chip is determined based on one or more of the port information, the configuration information, and the traffic information of the network chip. Then, the target operating frequency that adapts to the current network is determined based on the resource requirement information. The network chip is controlled to operate at the target operating frequency. In this way, power consumption of the network chip can be dynamically adjusted based on the current network, so that the power consumption of the network chip is reduced while a network requirement is met.

In a possible implementation, the port information includes a status of each port of the network chip.

The status of the port refers to an enabled state or a disabled state of the port, where the enabled state refers to an on state, and the disabled state refers to an off state.

In a possible implementation, the configuration information includes one or both of a protocol configured for the network chip and an entry configuration capacity of the network chip.

The protocol includes a fast detection protocol and a time synchronization protocol. The fast detection protocol may be a bidirectional forwarding detection (BFD) protocol, and the time synchronization protocol may be a 1588 protocol.

The entry configuration capacity is a capacity occupied by a configured entry.

In a possible implementation, the traffic information includes one or more of a replication bandwidth requirement of the network chip in first target duration, a maximum millisecond-level burst of the network chip in second target duration, and a maximum buffer waterline of the network chip in third target duration.

The replication bandwidth requirement may be determined based on a multicast replication packet proportion and a quantity of packets that need to be replicated. For example, a product of the multicast replication packet proportion and the quantity of packets that need to be replicated may be used as the replication bandwidth requirement. The first target duration may be one week, but is not limited thereto.

The maximum millisecond-level burst may also be referred to as a pps (packet per second) burst, and indicate duration of full-bandwidth traffic on the network chip. The second target duration may be one week, but is not limited thereto.

The maximum buffer waterline in the third target duration is a maximum ratio of a used buffer in the third target duration to a buffer capacity. The third target duration may be one week, but is not limited thereto.

In a possible implementation, the resource requirement information of the current network for the network chip includes resource requirement information of the current network for each functional module of the network chip.

In a possible implementation, the determining resource requirement information for the network chip based on one or more of port information, configuration information, and traffic information of the network chip includes: determining resource requirement information of the current network for an interface module of the network chip based on the status of the port of the network chip.

According to the technical solution provided in this disclosure, a larger quantity of ports in the enabled state in the network chip indicates a larger resource requirement of the current network for the interface module of the network chip.

In a possible implementation, the determining resource requirement information for the network chip based on one or more of port information, configuration information, and traffic information of the network chip includes: determining resource requirement information of the current network for a data channel processing module of the network chip based on the replication bandwidth requirement of the network chip in the first target duration and the protocol configured for the network chip.

According to the technical solution provided in this disclosure, a larger replication bandwidth requirement indicates a larger resource requirement of the current network for the interface module of the network chip.

If the fast detection protocol such as the BFD protocol and the time synchronization protocol such as the 1588 protocol are configured for the network chip, the current network has a large resource requirement for the interface module of the network chip.

In a possible implementation, the determining resource requirement information for the network chip based on one or more of port information, configuration information, and traffic information of the network chip includes: determining resource requirement information of the current network for a forwarding processing core of the network chip based on the maximum millisecond-level burst of the network chip in the second target duration.

According to the technical solution provided in this disclosure, a larger maximum millisecond-level burst of the network chip in the second target duration indicates a larger resource requirement of the current network for the forwarding processing core.

In a possible implementation, the determining resource requirement information for the network chip based on one or more of port information, configuration information, and traffic information of the network chip includes: determining resource requirement information of the current network for a traffic scheduling module of the network chip based on the maximum buffer waterline of the network chip in the third target duration.

According to the technical solution provided in this disclosure, a larger maximum buffer waterline of the network chip in the third target duration indicates a larger resource requirement of the current network for the traffic scheduling module.

In a possible implementation, the determining resource requirement information for the network chip based on one or more of port information, configuration information, and traffic information of the network chip includes: determining resource requirement information of the current network for a table lookup module of the network chip based on the entry configuration capacity of the network chip.

According to the technical solution provided in this disclosure, a larger entry configuration capacity indicates a larger resource requirement of the current network for the table lookup module.

In a possible implementation, the determining a target operating frequency of the network chip based on the resource requirement information for the network chip includes: determining, based on resource requirement information of the current network for each first functional module of the network chip, a target operating frequency corresponding to the first functional module, where the current network has a resource requirement for the first functional module; and controlling the first functional module to operate at the corresponding target operating frequency.

According to the technical solution provided in this disclosure, the corresponding target operating frequency is determined for the first functional module, and the first functional module is controlled to operate at the corresponding target operating frequency, so that the network chip can more accurately perform adjustment based on the current network, and the power consumption of the network chip better matches the current network.

In a possible implementation, after the determining resource requirement information of a current network for the network chip, the method further includes: controlling a second functional module of the network chip to switch from an operating state to a dormant state, where the current network has no resource requirement for the second functional module.

According to the technical solution provided in this disclosure, the second functional module having no resource requirement is controlled to switch from the operating state to the dormant state, to further reduce the power consumption of the network chip.

In a possible implementation, the controlling a second functional module of the network chip to switch from an operating state to a dormant state includes: controlling the second functional module to remain in a reset state.

In a possible implementation, the controlling a second functional module of the network chip to switch from an operating state to a dormant state includes: controlling to perform clock gating on the second functional module.

In a possible implementation, the controlling a second functional module of the network chip to switch from an operating state to a dormant state includes: controlling to perform power gating on the second functional module.

In a possible implementation, the controlling a second functional module of the network chip to switch from an operating state to a dormant state includes: controlling the second functional module to operate at a dormant operating frequency.

The dormant operating frequency is lower than 5% of a standard operating frequency of the second functional module. In a possible implementation, the dormant operating frequency is less than 1 MHz. The standard operating frequency is an operating frequency of a functional module of the network chip when the functional module operates normally, and the standard operating frequency may also be referred to as a maximum operating frequency.

When the second functional module operates at the dormant operating frequency, it is not ensured that a function of the second functional module is available. In a possible implementation, when the second functional module operates at the dormant operating frequency, a function of the first functional module is unavailable.

According to the technical solution provided in this disclosure, the second functional module is controlled to operate at the dormant operating frequency, so that power consumption of the second functional module is reduced, the second functional module is not required to support power gating and clock gating, and reliability of a circuit is not affected.

In a possible implementation, after the controlling a second functional module of the network chip to switch from an operating state to a dormant state, the method further includes: when it is detected that the current network has a resource requirement for the second functional module of the network chip, controlling the second functional module to switch from the dormant state to the operating state.

According to the technical solution provided in this disclosure, when it is detected that the current network has the resource requirement for the second functional module, the second functional module switches from the dormant state to the operating state, so that the function of the second functional module is available, and a network requirement can be met.

In a possible implementation, after the controlling a second functional module of the network chip to switch from an operating state to a dormant state, the method further includes: controlling the second functional module to switch from the dormant state to the operating state when a failure mode and effect analysis (FMEA) detection periodicity is reached; and controlling the network chip to perform FMEA detection.

According to the technical solution provided in this disclosure, when the FMEA detection periodicity is reached, the second functional module switches from the dormant state to the operating state, so that all functional modules of the network chip are available.

Then, the network chip can be normally controlled to perform FMEA detection. After the detection, if it is found that the network chip has a reliability problem, fast hardware isolation and/or replacement may be performed in a timely manner.

In a possible implementation, the method further includes: adjusting a voltage of the network chip to a target voltage, where the target voltage matches the target operating frequency.

According to the technical solution provided in this disclosure, if the determined target operating frequency is lower than a current operating frequency of the network chip, the network chip is first controlled to operate at the target operating frequency, and then the voltage of the network chip is controlled to decrease. In this way, the power consumption of the network chip is further reduced.

If the determined target operating frequency is higher than the current operating frequency of the network chip, the voltage of the network chip is first controlled to increase, and then the network chip is controlled to operate at the target operating frequency. In this way, the voltage of the network chip can support the network chip in stably operating at the target operating frequency.

In a possible implementation, after the controlling the network chip to operate at the target operating frequency, the method further includes: obtaining power consumption of the network chip at the target operating frequency; and adjusting a phase quantity of a voltage regulator module (VRM) of the network chip based on the power consumption of the network chip at the target operating frequency.

According to the technical solution provided in this disclosure, the phase quantity of the VRM is further adjusted based on the adjusted power consumption of the network chip, to improve efficiency of the VRM.

In a possible implementation, the obtaining power consumption of the network chip at the target operating frequency includes: obtaining reference power consumption of the network chip at a standard operating frequency; and determining, based on the reference power consumption, the standard operating frequency, and the target operating frequency, the power consumption of the network chip at the target operating frequency.

In a possible implementation, the obtaining power consumption of the network chip at the target operating frequency includes: detecting the power consumption of the network chip at the target operating frequency.

According to a second aspect, this disclosure provides a network chip management apparatus, where the apparatus is located in a communication device, the communication device has a service board, the service board has a network chip, and the apparatus includes a determining module and a control module.

The determining module is configured to: determine resource requirement information of a current network for the network chip based on one or more of port information, configuration information, and traffic information of the network chip; and determine a target operating frequency of the network chip based on the resource requirement information.

The control module is configured to control the network chip to operate at the target operating frequency.

In a possible implementation, the port information includes a status of each port of the network chip.

The configuration information includes one or both of a protocol configured for the network chip and an entry configuration capacity of the network chip.

The traffic information includes one or more of a replication bandwidth requirement of the network chip in first target duration, a maximum millisecond-level burst of the network chip in second target duration, and a maximum buffer waterline of the network chip in third target duration.

In a possible implementation, the resource requirement information of the current network for the network chip includes resource requirement information of the current network for each functional module of the network chip; and when determining the resource requirement information for the network chip, the determining module is configured to perform one or more of the following operations:

- determine resource requirement information of the current network for an interface module of the network chip based on the status of the port of the network chip;
- determine resource requirement information of the current network for a data channel processing module of the network chip based on the replication bandwidth requirement of the network chip in the first target duration and the protocol configured for the network chip;
- determine resource requirement information of the current network for a forwarding processing core of the network chip based on the maximum millisecond-level burst of the network chip in the second target duration;
- determine resource requirement information of the current network for a traffic scheduling module of the network chip based on the maximum buffer waterline of the network chip in the third target duration; or
- determine resource requirement information of the current network for a table lookup module of the network chip based on the entry configuration capacity of the network chip.

In a possible implementation, the resource requirement information of the current network for the network chip includes the resource requirement information of the current network for the functional module of the network chip; and when the target operating frequency of the network chip is determined: The determining module is configured to determine, based on resource requirement information of the current network for each first functional module of the network chip, a target operating frequency corresponding to the first functional module, where the current network has a resource requirement for the first functional module.

The control module is configured to control the first functional module to operate at the corresponding target operating frequency.

In a possible implementation, the apparatus further includes a dormant module, and the dormant module is configured to:

- control a second functional module of the network chip to switch from an operating state to a dormant state, where the current network has no resource requirement for the second functional module.

In a possible implementation, the dormant module is configured to:

- control the second functional module to remain in a reset state;
- control to perform clock gating on the second functional module;
- control to perform power gating on the second functional module; or
- control the second functional module to operate at a dormant operating frequency, where the dormant operating frequency is lower than 5% of a standard operating frequency of the second functional module.

In a possible implementation, the apparatus further includes a first wake-up module, and after the second functional module switches from the operating state to the dormant state, the first wake-up module is configured to:

when it is detected that the current network has a resource requirement for the second functional module of the network chip, control the second functional module to switch from the dormant state to the operating state.

In a possible implementation, the apparatus further includes a second wake-up module, and after the second functional module switches from the operating state to the dormant state: The second wake-up module is configured to control the second functional module to switch from the dormant state to the operating state when an FMEA detection periodicity is reached.

The control module is further configured to control the network chip to perform FMEA detection.

In a possible implementation, the apparatus further includes a first adjustment module, and the first adjustment module is configured to:

adjust a voltage of the network chip to a target voltage, where the target voltage matches the target operating frequency.

In a possible implementation, the apparatus further includes a second adjustment module, and the second adjustment module is configured to:

obtain power consumption of the network chip at the target operating frequency; and adjust a phase quantity of a VRM of the network chip based on the power consumption of the network chip at the target operating frequency.

In a possible implementation, when obtaining the power consumption of the network chip at the target operating frequency, the second adjustment module is configured to:

obtain reference power consumption of the network chip at a standard operating frequency; and determine, based on the reference power consumption, the standard operating frequency, and the target operating frequency, the power consumption of the network chip at the target operating frequency.

In a possible implementation, when obtaining the power consumption of the network chip at the target operating frequency, the second adjustment module is configured to:

detect the power consumption of the network chip at the target operating frequency.

According to a third aspect, this disclosure provides a communication device. The communication device includes a processor and a service board, the service board has a network chip, and the processor is configured to execute computer instructions, so that the communication device performs the network chip management method according to the first aspect.

According to a fourth aspect, this disclosure provides a computer-readable storage medium. The computer-readable storage medium stores at least one computer instruction, and the computer instruction is read by a processor of a communication device, so that the communication device performs the network chip management method according to the first aspect.

According to a fifth aspect, this disclosure provides a computer program product. The computer program product includes computer instructions, and the computer instructions are stored in a computer-readable storage medium. A processor of a communication device reads the computer instructions from the computer-readable storage medium, and the processor executes the computer instructions, so that the communication device performs the network chip management method according to the first aspect.

According to a sixth aspect, this disclosure provides a chip, including a memory and a processor. The memory is configured to store computer instructions, and the processor is configured to invoke the computer instructions from the memory and run the computer instructions, to perform the network chip management method according to the first aspect.

DESCRIPTION OF EMBODIMENTS

Communication devices, such as a router and a switch, are configured to receive and send a packet. The communication device may include a frame-shaped communication device and a box-shaped communication device.

Figure 1:
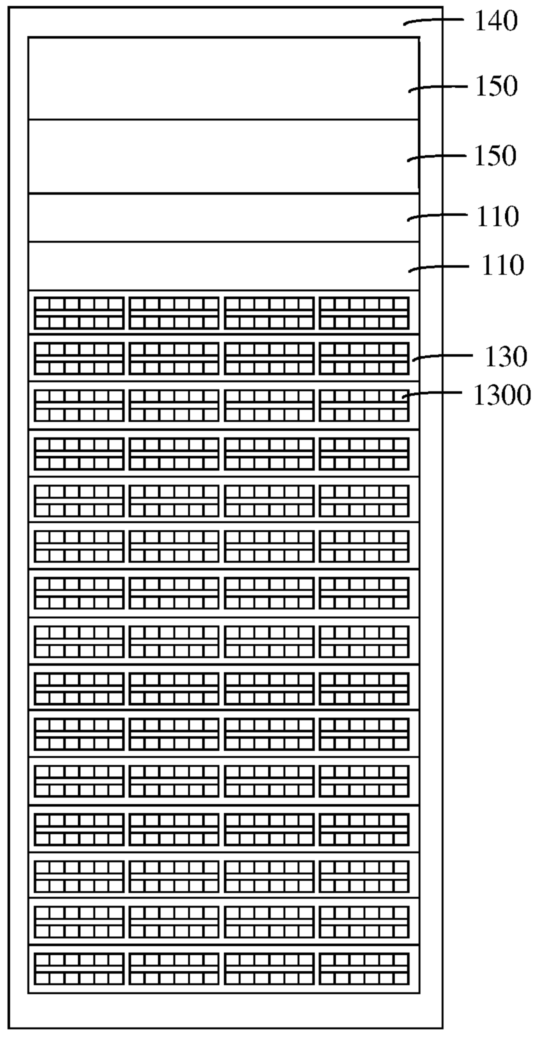
FIG. 1 is an example schematic diagram of a frame-shaped communication device according to an embodiment of this disclosure.

As shown in FIG. 1, the frame-shaped communication device includes a main control board 110, a switch board 120 (which is not shown in FIG. 1), a service board 130, a subrack 140, and a power module 150. The main control board 110 is configured to manage the switch board 120 and the service board 130, the switch board 120 is responsible for forwarding a packet between different service boards 130, the service board 130 has a network chip, and the network chip is responsible for receiving and sending the packet. Specifically, the network chip has a plurality of ports 1300, and the ports 1300 are configured to interconnect with optical modules, to receive and send packets.

Figure 2:
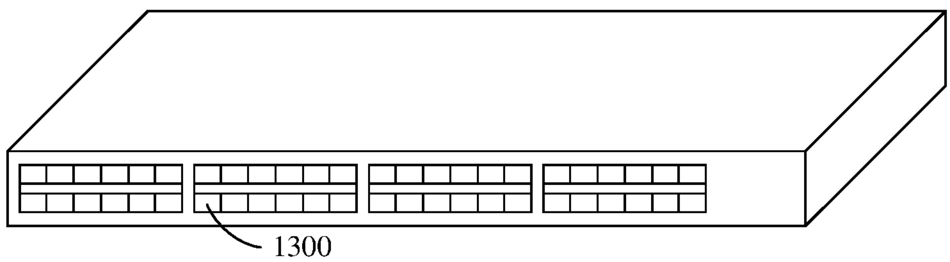
FIG. 2 is an example schematic diagram of a box-shaped communication device according to an embodiment of this disclosure.

As shown in FIG. 2, the box-shaped communication device includes a service board 130, the service board 130 has a network chip, and the network chip is responsible for receiving and sending a packet. Specifically, the network chip has a plurality of ports 1300, and the ports 1300 are configured to interconnect with optical modules, to receive and send packets.

Figure 3:
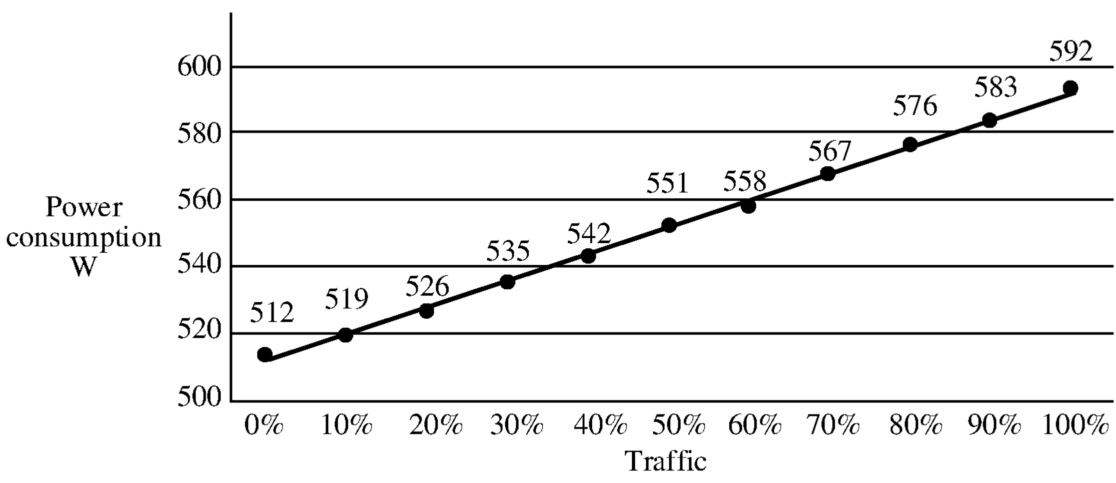
FIG. 3 is an example comparison diagram of power consumption of a network chip operating under different traffic according to an embodiment of this disclosure.

During network running, a large proportion of ports 1300 of the communication device are in an idle state, and some network chips are not fully used. However, power consumption of the network chip that is not fully used is still very high, and is not greatly different from power consumption of a network chip that is fully used. For example, as shown in FIG. 3, a ratio of power consumption of a service board when all network chips on the service board are in an idle state (that is, usage of all the network chips is 0%) and traffic corresponding to the service board is 0% to power consumption when traffic is 100% is as high as 512/592=86.5%.

To reduce power consumption of a network chip, an idle network chip is usually powered off in a related technology. However, power consumption of a non-idle but low-usage network chip is still very high.

In view of the foregoing technical problem, an embodiment of this disclosure provides a network chip management method. According to the method, resource requirement information of a current network for a network chip is determined based on one or more of port information, configuration information, and traffic information of the network chip. A target operating frequency of the network chip is determined based on the resource requirement information. Then, the network chip is controlled to operate at the target operating frequency.

The target operating frequency adapts to the current network. Therefore, power consumption of the network chip can be dynamically adjusted based on the current network, so that the power consumption of the network chip is reduced while a network requirement is met.

The network chip management method provided in embodiments of this disclosure may be performed by a communication device. For example, the method may be performed by a processor in the communication device, and the processor is configured to manage the network chip. In some examples, the processor is located in a main control board of the communication device. In some other examples, the processor is located in a service board of the communication device.

The following provides example descriptions of the communication device.

Figure 4:
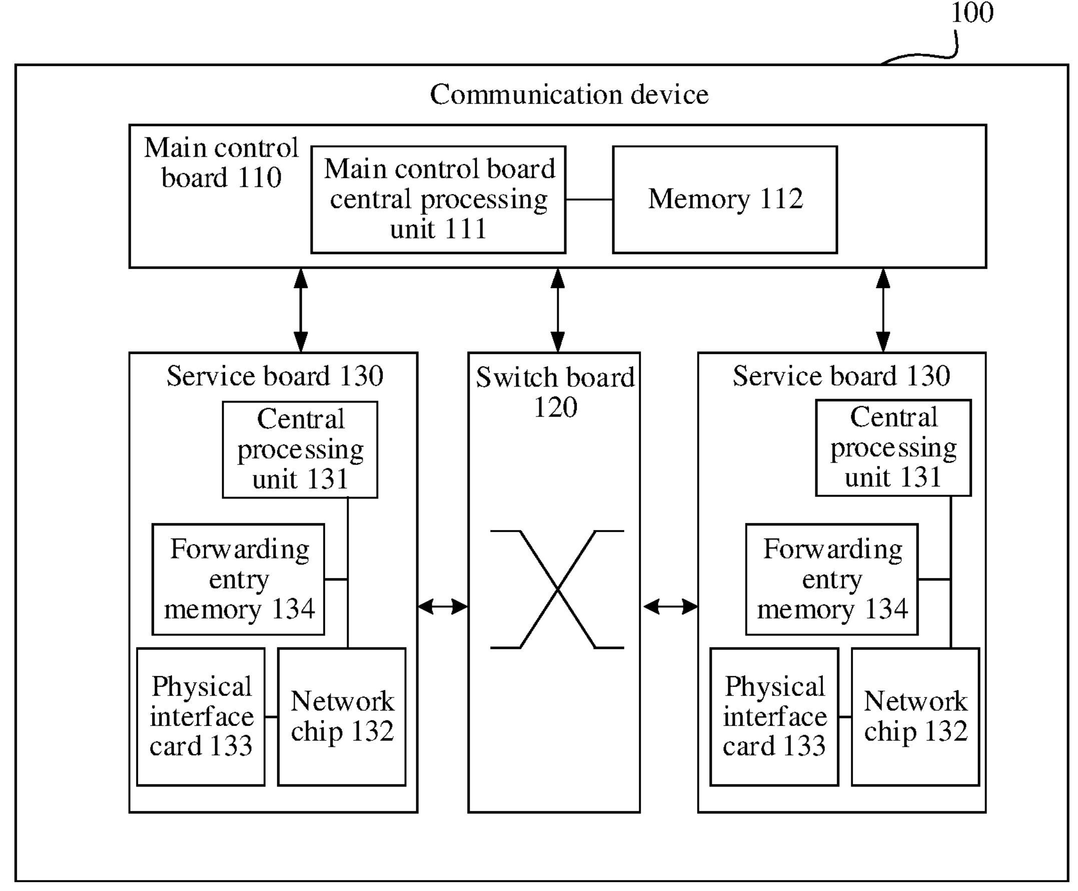
FIG. 4 is an example schematic diagram of a structure of a communication device according to an embodiment of this disclosure.

FIG. 4 is a schematic diagram of a structure of a communication device 100. The communication device 100 includes a main control board 110 and a service board 130.

The main control board 110 is also referred to as a main processing unit (MPU) or a route processor card. The main control board 110 is configured to control and manage components in the communication device 100, including functions such as route calculation, device management, device maintenance, and protocol processing. The main control board 110 includes a main control board central processing unit 111 and a memory 112. The network chip management method provided in embodiments of this disclosure may be performed by the main control board central processing unit 111 on the main control board 110.

The service board 130 is also referred to as an interface board, a line interface unit card (LPU), or a line card. The service board 130 is configured to provide various service interfaces, and forward a data packet. The service interfaces include but are not limited to an Ethernet interface, a POS (Packet over SONET/SDH) interface, and the like. The Ethernet interface is, for example, a flexible Ethernet service interface (Flexible Ethernet Clients, FlexE Clients). The service board 130 includes a central processing unit 131, a network chip 132, a forwarding entry memory 134, and a physical interface card (PIC) 133.

The central processing unit 131 on the service board 130 is configured to control and manage the service board 130 and communicate with the main control board central processing unit 111 on the main control board 110. The network chip management method provided in embodiments of this disclosure may also be executed by the central processing unit 131 on the service board 130.

The network chip 132 is configured to implement packet forwarding processing. A form of the network chip 132 may be a forwarding chip. Specifically, the network chip 132 is configured to forward a received packet based on a forwarding table stored in the forwarding entry memory 134. If a destination address of the packet is an address of the communication device 100, the packet is sent to a CPU (for example, the main control board central processing unit 111) for processing. If a destination address of the packet is not an address of the communication device 100, a next hop and an outbound interface corresponding to the destination address are found in the forwarding table based on the destination address, and the packet is forwarded to the outbound interface corresponding to the destination address. Processing on an uplink packet includes processing on a packet inbound interface and forwarding table lookup. Processing on a downlink packet includes forwarding table lookup and the like.

The physical interface card 133 is configured to implement a physical layer interconnection function. Original traffic enters the service board 130 from the physical interface card 133, and a processed packet is sent from the physical interface card 133. The physical interface card 133, also referred to as a subcard, may be installed on the service board 130, and is responsible for converting an optical/electrical signal into a packet, performing validity check on the packet, and forwarding the packet to the network chip 132 for processing. In some embodiments, the central processing unit may alternatively perform a function of the network chip 132, for example, implement software forwarding based on a general-purpose CPU. Therefore, the network chip 132 is not needed in the physical interface card 133. The physical interface card 133 may have a port 1300.

In some examples, the communication device 100 includes a plurality of service boards 130.

In some examples, the communication device 100 further includes a switch board 120. The switch board 120 may also be referred to as a switch fabric unit (SFU). When the communication device 100 has a plurality of service boards 130, the switch board 120 is configured to complete data exchange between the service boards 130. For example, two service boards 130 in FIG. 4 may communicate with each other through the switch board 120.

The main control board 110 is coupled to the service board 130. For example, the main control board 110, the two service boards 130, and the switch board 120 are connected to a system backplane through a system bus to implement interworking. In some examples, an inter-process communication (IPC) protocol channel is established between the main control board 110 and the service board 130, and communication is performed between the main control board 110 and the service board 130 through the IPC channel.

Logically, the communication device 100 includes a control plane and a forwarding plane. The control plane includes the main control board 110 and the central processing unit 131. The forwarding plane includes components for forwarding, for example, the forwarding entry memory 134, the physical interface card 133, and the network chip 132. The control plane performs functions such as a function of a router, generating a forwarding table, processing signaling and a protocol packet, and configuring and maintaining a device status. The control plane delivers the generated forwarding table to the forwarding plane. On the forwarding plane, the network chip 132 looks up the forwarding table delivered by the control plane to forward a packet received by the physical interface card 133. The forwarding table delivered by the control plane may be stored in the forwarding entry memory 134. In some embodiments, the control plane and the forwarding plane may be completely separated, and are not on a same device.

It should be noted that there may be one or more main control boards 110. When there are a plurality of main control boards 110, the main control boards 110 may include an active main control board and a standby main control board. There may be one or more service boards 130, and a stronger data processing capability of the communication device indicates a larger quantity of service boards 130 provided. There may also be one or more physical interface cards on the service board 130. There may be no switch board 120, or there may be one or more switch boards 120. When there are a plurality of switch boards 120, load sharing and redundancy backup may be implemented together. In a centralized forwarding architecture, the communication device may need no switching board 120, and the service board 130 undertakes a service data processing function of the entire system. In a distributed forwarding architecture, the communication device may have at least one switch board 120, and data exchange between the plurality of service boards 130 is implemented by using the switch board 120, to provide a large-capacity data exchange and processing capability. Therefore, a data access and processing capability of a communication device in the distributed architecture is greater than that of a device in the centralized architecture. In some examples, a form of the communication device may alternatively include only one board, that is, there is no switching board 120, and functions of the service board 130 and the main control board 110 are integrated on the board. In this case, the central processing unit on the service board 130 and the central processing unit on the main control board 110 may be combined into one central processing unit on the same board, to perform functions obtained by combining the two central processing units. The device (for example, communication devices such as a low-end switch or router) in this form has a low data exchange and processing capability. A specific architecture that is to be used depends on a specific networking deployment scenario. This is not limited herein.

Figures 5, 6:
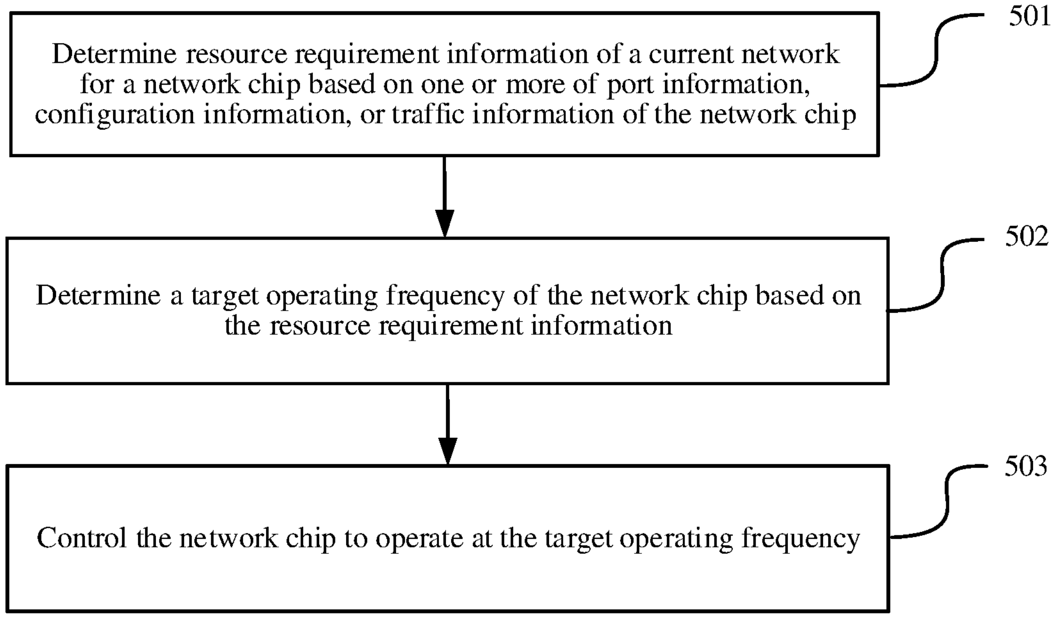
FIG. 5 is an example flowchart of a network chip management method according to an embodiment of this disclosure.
FIG. 6 is an example logical block diagram of a network chip management apparatus according to an embodiment of this disclosure.

Refer to FIG. 5. With reference to a specific implementation, the following describes in detail a processing procedure of a network chip management method according to an embodiment of this disclosure. Content may be as follows.

Step 501: Determine resource requirement information of a current network for a network chip based on one or more of port information, configuration information, and traffic information of the network chip.

The resource requirement information of the current network for the network chip represents a quantity of resources that the current network requires the network chip to provide, to ensure reliable running of the current network. The resource requirement information may be represented in a form of a percentage, and indicates a percentage of resources that need to be used by the network chip to meet a requirement for the stable running of the current network.

The following separately describes the port information, the configuration information, and the traffic information by using examples.

In some examples, the port information includes a status of each port of the network chip.

The status of the port refers to an enabled state or a disabled state of the port, where the enabled state refers to an on state, and the disabled state refers to an off state.

In some examples, the configuration information includes a protocol configured for the network chip.

The protocol may include a fast detection protocol, a time synchronization protocol, and the like. The fast detection protocol may be a bidirectional forwarding detection (BFD) protocol, and the time synchronization protocol may be a 1588 protocol.

In some examples, the configuration information includes an entry configuration capacity of the network chip.

The entry configuration capacity is a capacity occupied by a configured entry.

In some examples, the traffic information includes a replication bandwidth requirement of the network chip in first target duration.

The replication bandwidth requirement may be determined based on a multicast replication packet proportion and a quantity of packets that need to be replicated. For example, a product of the multicast replication packet proportion and the quantity of packets that need to be replicated may be used as the replication bandwidth requirement. The first target duration may be one week, but is not limited thereto.

In some examples, the traffic information includes a maximum millisecond-level burst of the network chip in second target duration.

The maximum millisecond-level burst may also be referred to as a pps (packet per second) burst, and indicate duration of full-bandwidth traffic on the network chip. The second target duration may be one week, but is not limited thereto.

In some examples, the traffic information includes a maximum buffer waterline of the network chip in third target duration.

The maximum buffer waterline in the third target duration is a maximum ratio of a used buffer in the third target duration to a buffer capacity. The third target duration may be one week, but is not limited thereto.

The following describes processing of determining the resource requirement information based on one or more of the port information, the configuration information, and the traffic information by using an example.

In some examples, the resource requirement information is resource requirement information for the network chip as a whole, that is, the network chip as a whole corresponds to one piece of resource requirement information.

In some other examples, the resource requirement information is resource requirement information for each functional module of the network chip, and each functional module corresponds to one piece of resource requirement information.

The following uses several specific functional modules as an example to describe an example of a process of determining the resource requirement information.

In some examples, resource requirement information of the current network for an interface module of the network chip is determined based on the status of the port of the network chip.

A larger quantity of ports in the enabled state in the network chip indicates a larger resource requirement of the current network for the interface module of the network chip. During running of the current network, if a user enables a new port, it indicates that the current network has a larger resource requirement for the interface module of the network chip.

In some examples, resource requirement information of the current network for a data channel processing module of the network chip is determined based on the replication bandwidth requirement of the network chip in the first target duration and the protocol configured for the network chip.

A larger replication bandwidth requirement indicates a larger resource requirement of the current network for the interface module of the network chip.

If the fast detection protocol such as the BFD protocol and the time synchronization protocol such as the 1588 protocol are configured for the network chip, it indicates that the current network has a large resource requirement for the interface module of the network chip.

In some examples, resource requirement information of the current network for a forwarding processing core of the network chip is determined based on the maximum millisecond-level burst of the network chip in the second target duration.

A larger maximum millisecond-level burst of the network chip in the second target duration indicates a larger resource requirement for the forwarding processing core.

In some examples, resource requirement information of the current network for a traffic scheduling module of the network chip is determined based on the maximum buffer waterline of the network chip in the third target duration.

A larger maximum buffer waterline of the network chip in the third target duration indicates a larger resource requirement for the traffic scheduling module.

In some examples, resource requirement information of the current network for a table lookup module of the network chip is determined based on the entry configuration capacity of the network chip.

A larger entry configuration capacity indicates a larger resource requirement of the current network for the table lookup module. During running of the current network, if a user configures a new entry, it indicates that the current network has a larger resource requirement for the table lookup module.

It should be noted that, after the resource requirement information of the foregoing functional modules is determined, the resource requirement information of each functional module may be used as a final result, or calculation (for example, weighted calculation or averaging) may be performed based on the resource requirement information of the functional modules, to determine the resource requirement information of the network chip as a whole.

In addition, when the resource requirement information of each functional module is determined, a specific margin may be reserved, to be specific, the resource requirement information of the functional module is larger than resource requirement information actually required by the current network, to ensure reliability of the network in response to a sudden increase of a network resource requirement during running.

In addition, when the resource requirement information of the current network for the network chip is determined based on one or more of the port information, the configuration information, and the traffic information of the network chip, same processing may be performed each time. To be specific, the resource requirement information of the current network for the network chip needs to be recalculated each time based on one or more of the port information, the configuration information, and the traffic information of the network chip.

Alternatively, different processing may be performed each time. For example, before the method provided in this embodiment of this disclosure is used, traffic information in target duration (where the target duration is the largest one of the first target duration, the second target duration, and the third target duration) is first collected, and then resource requirement information is obtained through calculation based on current port information, current configuration information, and the collected traffic information (that is, the resource requirement information is determined for the first time).

Subsequently, if the port information and the configuration information do not change, and a change of the traffic information is within a specific threshold range, it is determined that the resource requirement information remains unchanged, and recalculation is not performed. However, if the port information and the configuration information change, or the change of the traffic information exceeds the threshold range, resource requirement information is obtained through recalculation based on changed information.

Step 502: Determine a target operating frequency of the network chip based on the resource requirement information.

A larger resource requirement represented by the resource requirement information indicates a higher target operating frequency of the network chip.

According to the technical solution provided in this embodiment of this disclosure, the target operating frequency of the network chip may be determined based on a correspondence between resource requirement information and an operating frequency.

For example, the correspondence between resource requirement information and an operating frequency may be determined and stored (for example, stored in a form of a table) in advance. After the resource requirement information is determined, the target operating frequency of the network chip may be determined based on the table.

In some examples, there is one target operating frequency. In this case, all the functional modules of the network chip may correspond to a same operating frequency.

In some other examples, there may be a plurality of target operating frequencies. In this case, each functional module of the network chip may correspond to one operating frequency, or each group of functional modules of the network chip may correspond to one operating frequency.

Each group of functional modules may be some functional modules having similar functions, and these functional modules may operate at a same operating frequency.

The following describes a process of determining the target operating frequency of the network chip based on the resource requirement information by using an example.

In some examples, when the resource requirement information is determined for the network chip as a whole, the target operating frequency of the network chip is determined based on the resource requirement information.

In some other examples, when the resource requirement information is determined for each functional module of the network chip, a target operating frequency corresponding to each first functional module is determined based on resource requirement information of the current network for the first functional module of the network chip.

The current network has a resource requirement for the first functional module, in other words, the resource requirement of the current network for the first functional module is not 0.

Step 503: Control the network chip to operate at the target operating frequency.

According to the technical solution provided in this embodiment of this disclosure, the network chip is controlled to operate at the target operating frequency, so that power consumption of the network chip matches the current network, and the power consumption of the network chip can be dynamically adjusted based on the network. In this way, the power consumption of the network chip is reduced while a network requirement is met.

In some examples, if the target operating frequency is determined for each first functional module, the first functional module is controlled to operate at the corresponding target operating frequency.

In addition to an operating frequency of the network chip, a voltage of the network chip may be further adjusted. In some examples, after the resource requirement information is determined, the voltage of the network chip is adjusted to a target voltage, where the target voltage matches the target operating frequency.

For example, if the determined target operating frequency is lower than a current operating frequency of the network chip, the network chip is first controlled to operate at the target operating frequency, and then the voltage of the network chip is controlled to decrease.

In this way, the power consumption of the network chip is further reduced. Usually, compared with only reducing the operating frequency, by first reducing the operating frequency and then further reducing the voltage, the power consumption of the network chip can be further reduced by 10%.

For another example, if the determined target operating frequency is higher than the current operating frequency of the network chip, the voltage of the network chip is first controlled to increase, and then the network chip is controlled to operate at the target operating frequency.

In this way, the voltage of the network chip can support the network chip in stably operating at the target operating frequency.

When the voltage of the network chip is adjusted, a specific adjustment manner varies based on different power supply manners of the chip. In some examples, all functional modules of the chip have a unified voltage. In this case, during voltage adjustment, the determined target voltage needs to match a highest operating frequency of target operating frequencies of the functional modules.

In some other examples, each functional module corresponds to a different voltage. In this case, during voltage adjustment, a corresponding target voltage may be determined for each functional module, and the target voltage of the functional module matches a target operating frequency of the functional module.

In addition, in some scenarios, it may be determined that there is no resource requirement for some functional modules, for example, a processing core, a packet buffer, and an entry buffer. This type of functional module may be collectively referred to as a second functional module.

To further reduce the power consumption of the network chip, the second functional module of the network chip may be controlled to switch from an operating state to a dormant state. Power consumption of the second functional module in the dormant state is low, and it may not be ensured that a function is available. In some examples, the function of the second functional module is unavailable in the dormant state.

The following describes an example of a processing manner of controlling the second functional module to switch from the operating state to the dormant state.

In some examples, the second functional module is controlled to remain in a reset state. When the second functional module remains in the reset state, the function of the second functional module is unavailable.

In some examples, clock gating is controlled to be performed on the second functional module. When the clock gating is performed on the second functional module, the function of the second functional module is unavailable.

In some examples, power gating is controlled to be performed on the second functional module. The power gating may also be referred to as power gating. When the power gating is performed on the second functional module, the function of the second functional module is unavailable.

In some examples, the second functional module is controlled to operate at a dormant operating frequency. The dormant operating frequency is less than 5% of a standard operating frequency of the second functional module, and the dormant operating frequency is an extremely low operating frequency. For example, the dormant operating frequency may be less than 1 MHz. The standard operating frequency is an operating frequency of a functional module of the network chip when the functional module operates normally, and the standard operating frequency may also be referred to as a maximum operating frequency.

When the second functional module operates at the dormant operating frequency, it is not ensured that the function of the second functional module is available. For example, when the second functional module operates at the dormant operating frequency, a function of the first functional module is unavailable.

It should be noted that, when the second functional module is controlled to switch from the operating state to the dormant state, a specific processing manner may be determined based on a specific feature of the second functional module. For example, the power gating is performed on a second functional module supporting power gating. The clock gating is performed on a second functional module that supports clock gating and that does not affect reliability after the clock gating, or the second functional module remains in the reset state. For a second functional module that does not support power gating and clock gating or that affects reliability after the clock gating, the second functional module is controlled to operate at the dormant operating frequency.

During actual application, due to a network change, the network may have a resource requirement for the second functional module. In this case, the second functional module needs to be woken up.

In some examples, after the second functional module is controlled to switch from the operating state to the dormant state, when it is detected that the current network has the resource requirement for the second functional module, the second functional module is controlled to switch from the dormant state to the operating state. The function of the second functional module is available in the operating state.

The following describes an example of a processing manner of controlling the second functional module to switch from the dormant state to the operating state.

In some examples, if the second functional module is previously controlled to remain in the reset state, the second functional module is controlled to de-assert the reset state during wakeup.

In some examples, if the clock gating is previously controlled to be performed on the second functional module, the second functional module is controlled to enable a clock during wakeup.

In some examples, if the power gating is previously controlled to be performed on the second functional module, the second functional module is controlled to be powered on during wakeup.

In some examples, if the second functional module is previously controlled to operate at the dormant operating frequency, the second functional module is controlled to operate at a higher operating frequency during wakeup. The higher operating frequency may be a standard operating frequency of the second functional module, or may be an operating frequency that is lower than the standard operating frequency but can ensure that the function of the second functional module is available.

After the foregoing processing, the second functional module is woken up, and each functional module of the network chip is available, so that normal packet receiving and sending can be performed. It should be noted that frequency increasing of the second functional module, clock enabling of the second functional module, and power-on of the second functional module may be implemented by resetting the network chip.

In addition, to enable a target network chip to normally perform failure mode and effect analysis (FMEA) detection, in some examples, after the second functional module is controlled to switch from the operating state to the dormant state, the second functional module is controlled to switch from the dormant state to the operating state when an FMEA detection periodicity is reached.

For a processing manner of controlling the second functional module to switch from the dormant state to the operating state, refer to the foregoing related content.

After the foregoing processing, the second functional module is woken up, and each functional module of the network chip is available. Then, the network chip is controlled to perform FMEA detection. After the detection, if it is found that the network chip has a reliability problem, fast hardware isolation and/or replacement may be performed in a timely manner.

To improve efficiency of a voltage regulator module (VRM), in some examples, after the network chip is controlled to operate at the target operating frequency, power consumption of the network chip at the target operating frequency is obtained. A phase quantity of the VRM of the network chip is adjusted based on the power consumption of the network chip at the target operating frequency.

For the VRM, there is a target load rate. When a load rate of the VRM is the target load rate, the efficiency of the VRM is the highest.

The load rate is a ratio of a load of the VRM to a power supply capability of the VRM. The load of the VRM corresponds to the power consumption of the network chip. The power supply capability of the VRM is equal to a power supply capability of each phase of the VRM multiplied by the phase quantity of the VRM. Therefore, when the power consumption of the network chip changes, the load rate may be changed by adjusting the phase quantity of the VRM, to improve the efficiency of the VRM. Usually, the target load rate is 40%.

For example, after the power consumption of the network chip at the target operating frequency is obtained, the load of the VRM is determined based on the power consumption, and then a target phase quantity is determined based on the load. If the target phase quantity is the same as a current phase quantity, the phase quantity is not adjusted. If the target phase quantity is different from a current phase quantity, the phase quantity is increased or decreased.

A manner of obtaining the power consumption of the network chip at the target operating frequency is not limited in this embodiment of this disclosure. In some examples, the power consumption of the network chip at the target operating frequency may be directly detected.

In some other examples, reference power consumption of the network chip at a standard operating frequency is obtained. The power consumption of the network chip at the target operating frequency is determined based on the reference power consumption, the standard operating frequency, and the target operating frequency.

A power consumption reduction proportion of the network chip can be determined based on the standard operating frequency and the target operating frequency. Then, an absolute value of power consumption reduction can be obtained by multiplying the proportion by the reference power consumption, and the power consumption at the target operating frequency is obtained.

The following describes a manner of obtaining the reference power consumption of the network chip at the standard operating frequency by using an example.

In some examples, before the network chip management method provided in this embodiment of this disclosure is used, traffic information (for example, traffic, a buffer, and a maximum millisecond-level burst) of the network chip that operates at the standard operating frequency in target duration (for example, one week) is collected, and then the reference power consumption of the network chip at the standard operating frequency is determined based on the traffic information and a correspondence between traffic information and power consumption.

This embodiment of this disclosure provides the network chip management method. According to the method, the resource requirement information of the current network for the network chip is determined based on one or more of the port information, the configuration information, and the traffic information of the network chip. Then, the target operating frequency that adapts to the current network is determined based on the resource requirement information. The network chip is controlled to operate at the target operating frequency.

In this way, the power consumption of the network chip can be dynamically adjusted based on the current network, so that the power consumption of the network chip is reduced while the network requirement is met. In addition, a corresponding wake-up mechanism is configured for the dormant second functional module, so that the second functional module can be woken up when there is a resource requirement for the second functional module and when the FMEA detection periodicity is reached, to further ensure that the network chip meets a running requirement of the current network and ensure reliability of the network chip.

The foregoing describes the network chip management method provided in embodiments of this disclosure, and the following describes a network chip management apparatus provided in embodiments of this disclosure. The network chip management apparatus described below may implement any function according to the network chip management method.

FIG. 6 is a schematic diagram of a structure of a network chip management apparatus according to an embodiment of this disclosure. The network chip management apparatus is located in a communication device. As shown in FIG. 6, the network chip management apparatus includes a determining module 601 and a control module 602.

The determining module 601 is configured to: determine resource requirement information of a current network for a network chip based on one or more of port information, configuration information, and traffic information of the network chip; and determine a target operating frequency of the network chip based on the resource requirement information. The determining module 601 may be specifically configured to implement determining functions in step 501 and step 502, and perform implicit steps included in step 501 and step 502.

The control module 602 is configured to control the network chip to operate at the target operating frequency. The control module 602 may be specifically configured to implement a control function in step 503, and perform an implicit step included in step 503.

In some examples, the port information includes a status of each port of the network chip.

In some examples, the configuration information includes one or both of a protocol configured for the network chip and an entry configuration capacity of the network chip.

In some examples, the traffic information includes one or more of a replication bandwidth requirement of the network chip in first target duration, a maximum millisecond-level burst of the network chip in second target duration, and a maximum buffer waterline of the network chip in third target duration.

In some examples, the resource requirement information of the current network for the network chip includes resource requirement information of the current network for each functional module of the network chip; and when determining the resource requirement information for the network chip, the determining module 601 is configured to perform one or more of the following operations:

determine resource requirement information of the current network for an interface module of the network chip based on the status of the port of the network chip;

determine resource requirement information of the current network for a data channel processing module of the network chip based on the replication bandwidth requirement of the network chip in the first target duration and the protocol configured for the network chip;

determine resource requirement information of the current network for a forwarding processing core of the network chip based on the maximum millisecond-level burst of the network chip in the second target duration;

determine resource requirement information of the current network for a traffic scheduling module of the network chip based on the maximum buffer waterline of the network chip in the third target duration; or determine resource requirement information of the current network for a table lookup module of the network chip based on the entry configuration capacity of the network chip.

In some examples, the resource requirement information of the current network for the network chip includes the resource requirement information of the current network for the functional module of the network chip; and when the target operating frequency of the network chip is determined: The determining module 601 is configured to determine, based on resource requirement information of the current network for each first functional module of the network chip, a target operating frequency corresponding to the first functional module, where the current network has a resource requirement for the first functional module.

The control module 602 is configured to control the first functional module to operate at the corresponding target operating frequency.

In some examples, the apparatus further includes a dormant module, and the dormant module is configured to:

control a second functional module of the network chip to switch from an operating state to a dormant state, where the current network has no resource requirement for the second functional module.

In some examples, the dormant module is configured to:

control the second functional module to remain in a reset state;

control to perform clock gating on the second functional module;

control to perform power gating on the second functional module; or control the second functional module to operate at a dormant operating frequency, where the dormant operating frequency is lower than 5% of a standard operating frequency of the second functional module.

In some examples, the apparatus further includes a first wake-up module, and after the second functional module switches from the operating state to the dormant state, the first wake-up module is configured to:

when it is detected that a resource requirement of the current network for the second functional module of the network chip is not 0, control the second functional module to switch from the dormant state to the operating state.

In some examples, the apparatus further includes a second wake-up module, and after the second functional module switches from the operating state to the dormant state: The second wake-up module is configured to control the second functional module to switch from the dormant state to the operating state when a failure mode and effect analysis FMEA detection periodicity is reached.

The control module 602 is further configured to control the network chip to perform FMEA detection.

In some examples, the apparatus further includes a first adjustment module, and the first adjustment module is configured to:

adjust a voltage of the network chip to a target voltage, where the target voltage matches the target operating frequency.

In some examples, the apparatus further includes a second adjustment module, and the second adjustment module is configured to:

obtain power consumption of the network chip at the target operating frequency; and adjust a phase quantity of a VRM of the network chip based on the power consumption of the network chip at the target operating frequency.

In some examples, when obtaining the power consumption of the network chip at the target operating frequency, the second adjustment module is configured to:

obtain reference power consumption of the network chip at a standard operating frequency; and determine, based on the reference power consumption, the standard operating frequency, and the target operating frequency, the power consumption of the network chip at the target operating frequency.

In some examples, when obtaining the power consumption of the network chip at the target operating frequency, the second adjustment module is configured to:

detect the power consumption of the network chip at the target operating frequency.

It should be noted that the determining module 601, the control module 602, the dormant module, the first wake-up module, the second wake-up module, the first adjustment module, and the second adjustment module may be implemented by a processor, or implemented by a processor in cooperation with a memory, or implemented by a processor by executing program instructions in a memory.

When the network chip management apparatus manages the network chip, division of the foregoing functional modules is merely used as an example for description. During actual application, the foregoing functions may be allocated to different functional modules for implementation based on a requirement. That is, an internal structure of the network chip management apparatus is divided into different functional modules, to implement all or a part of the functions described above. In addition, the network chip management apparatus provided in the foregoing embodiment and the network chip management method shown in FIG. 5 are based on a same concept. For a specific implementation process, refer to a corresponding method part.

An embodiment of this disclosure provides a computer-readable storage medium. The computer-readable storage medium stores at least one computer instruction, and the computer instruction is read by a processor of a communication device, so that the communication device performs the network chip management method provided in embodiments of this disclosure.

An embodiment of this disclosure provides a computer program product. The computer program product includes computer instructions, and the computer instructions are stored in a computer-readable storage medium. A main control board of a communication device reads the computer instructions from the computer-readable storage medium, and a processor executes the computer instructions, so that the communication device performs the network chip management method provided in embodiments of this disclosure.

An embodiment of this disclosure provides a chip, including a memory and a processor. The memory is configured to store computer instructions, and the processor is configured to invoke the computer instructions from the memory and run the computer instructions, to perform the network chip management method provided in embodiments of this disclosure.

A person of ordinary skill in the art may be aware that, in combination with the examples described in embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and implementation constraints of the technical solutions. A person of ordinary skill in the art may use different methods to implement the described functions for each particular application, but it should not be considered that the implementation goes beyond the scope of this disclosure.

It may be understood by a person skilled in the art that, for the purpose of convenient and brief description, for a detailed working process of the foregoing system, apparatus, and unit, refer to a corresponding process in the foregoing method embodiment.

In the several embodiments provided in this disclosure, the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments of this disclosure.

In addition, functional units in embodiments of this disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this disclosure essentially, or the part contributing to the conventional technology, or all or a part of the technical solutions may be implemented in a form of a software product. The computer software product is stored in a storage medium, and includes several instructions for indicating a computer device (which may be a personal computer, a server, a communication device, or the like) to perform all or a part of the steps of the method according to embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method applied to a communication device, the communication device including, at least, a service board having a network chip, and the method comprising:

determining resource requirement information, of a current network for a plurality of functional modules of the network chip, based on one or more of: port information, configuration information, and traffic information of the network chip, wherein a plurality of first functional modules is a subset of the plurality of functional modules for which the current network has a resource requirement;

determining, based on the resource requirement information of the current network for each first functional module of the network chip, a plurality of target operating frequencies of the network chip, wherein each target operating frequency corresponds to a respective subset of first functional modules; and controlling each subset of first functional modules of the network chip to operate at a corresponding target operating frequency.

2. The method according to claim 1, wherein the port information includes a status of each port of the network chip, the configuration information includes at least one of a protocol configured for the network chip, and an entry configuration capacity of the network chip, and the traffic information includes at least one of a replication bandwidth requirement of the network chip in a first target duration, a maximum millisecond-level burst of the network chip in a second target duration, and a maximum buffer waterline of the network chip in a third target duration.

3. The method according to claim 2, wherein the resource requirement information, of the current network for the network chip, is included for each functional module of the network chip, and determining the resource requirement information for the network chip comprises:

determining resource requirement information of the current network for an interface module of the network chip based on the status of a port of the network chip;

determining resource requirement information of the current network for a data channel processing module of the network chip based on the replication bandwidth requirement of the network chip in the first target duration and the protocol configured for the network chip;

determining resource requirement information of the current network for a forwarding processing core of the network chip based on the maximum millisecond-level burst of the network chip in the second target duration;

determining resource requirement information of the current network for a traffic scheduling module of the network chip based on the maximum buffer waterline of the network chip in the third target duration; or determining resource requirement information of the current network for a table lookup module of the network chip based on the entry configuration capacity of the network chip.

4. The method according to claim 1, wherein the resource requirement information of the current network for the network chip is included for a functional module, of the plurality of functional modules, of the network chip, and determining the target operating frequency of the network chip based on the resource requirement information for the network chip comprises:

determining, based on resource requirement information of the current network for each of the first functional modules of the network chip, a target operating frequency corresponding to each of the first functional modules, wherein the current network has a resource requirement for each of the first functional modules; and controlling each of the first functional modules to operate at the corresponding target operating frequency.

5. The method according to claim 4, wherein a second functional module is one of the plurality of functional modules for which the current network has no resource requirement, and after determining resource requirement information of the current network for the network chip, the method further comprises:

controlling the second functional module of the network chip to switch from an operating state to a dormant state.

6. The method according to claim 5, wherein controlling the second functional module of the network chip to switch from the operating state to the dormant state comprises:

controlling the second functional module to remain in a reset state;

controlling to perform clock gating on the second functional module;

controlling to perform power gating on the second functional module; or controlling the second functional module to operate at a dormant operating frequency, wherein the dormant operating frequency is lower than 5% of a standard operating frequency of the second functional module.

7. The method according to claim 5, wherein after controlling the second functional module of the network chip to switch from the operating state to the dormant state, the method further comprises:

in association with the current network including a resource requirement for the second functional module of the network chip, controlling the second functional module to switch from the dormant state to the operating state.

8. The method according to claim 5, wherein after controlling the second functional module of the network chip to switch from the operating state to the dormant state, the method further comprises:

controlling the second functional module to switch from the dormant state to the operating state in association with a failure mode and effect analysis (FMEA) detection periodicity being reached; and controlling the network chip to perform FMEA detection.

9. The method according to claim 8, further comprising:

adjusting a voltage of the network chip to a target voltage matching the target operating frequency.

10. The method according to claim 1, wherein after controlling the network chip to operate at the target operating frequency, the method further comprises:

obtaining power consumption of the network chip at the target operating frequency; and adjusting a phase quantity of a voltage regulator module (VRM) of the network chip based on the power consumption of the network chip at the target operating frequency.

11. The method according to claim 10, wherein obtaining the power consumption of the network chip at the target operating frequency comprises:

obtaining reference power consumption of the network chip at a standard operating frequency, wherein the power consumption of the network chip at the target operating frequency is determined based on the reference power consumption, the standard operating frequency, and the target operating frequency.

12. The method according to claim 10, wherein obtaining the power consumption of the network chip at the target operating frequency comprises:

detecting the power consumption of the network chip at the target operating frequency.

13. An apparatus associated with a communication device, the communication device including a service board having a network chip, and the apparatus comprising:

a processor; and a memory configured to store computer readable instructions that, when executed by the processor, cause the apparatus to:

determine resource requirement information, of a current network for a plurality of functional modules of the network chip, based on one or more of: port information, configuration information, and traffic information of the network chip, wherein a plurality of first functional modules is a subset of the plurality of functional modules for which the current network has a resource requirement;

determine, based on the resource requirement information of the current network for each first functional module of the network chip, a plurality of target operating frequencies of the network chip, wherein each target operating frequency corresponds to a respective subset of first functional modules; and control each subset of first functional modules of the network chip to operate at a corresponding target operating frequency.

14. The apparatus according to claim 13, wherein the port information includes a status of each port of the network chip, the configuration information includes at least one of a protocol configured for the network chip, and an entry configuration capacity of the network chip, the traffic information includes at least one of a replication bandwidth requirement of the network chip in a first target duration, a maximum millisecond-level burst of the network chip in a second target duration, and a maximum buffer waterline of the network chip in a third target duration, the resource requirement information of the current network for the network chip is included for each functional module of the network chip, the resource requirement information for the network chip is determined for any of an interface module, a data channel processing module, a forwarding processing core, a traffic scheduling module, or a table lookup module of the network chip, and the resource requirement information of the current network for the interface module of the network chip is determined based on the status of the port of the network chip, the resource requirement information of the current network for the data channel processing module of the network chip is determined based on the replication bandwidth requirement of the network chip in the first target duration and the protocol configured for the network chip, the resource requirement information of the current network for the forwarding processing core of the network chip is determined based on the maximum millisecond-level burst of the network chip in the second target duration, the resource requirement information of the current network for the traffic scheduling module of the network chip is determined based on the maximum buffer waterline of the network chip in the third target duration, and the resource requirement information of the current network for the table lookup module of the network chip is determined based on the entry configuration capacity of the network chip.

15. The apparatus according to claim 13, wherein the resource requirement information of the current network for the network chip is included for a functional module, of the plurality of functional modules, of the network chip, and the apparatus is further caused to:

determine, based on resource requirement information of the current network for each of the first functional modules of the network chip, a target operating frequency corresponding to each of the first functional modules, wherein the current network has a resource requirement for each of the first functional modules; and control each of the first functional modules to operate at the corresponding target operating frequency.

16. The apparatus according to claim 15, wherein a second functional module is one of the plurality of functional modules for which the current network has no resource requirement, and the apparatus is further caused to:

control the second functional module of the network chip to switch from an operating state to a dormant state.

17. The apparatus according to claim 16, wherein the apparatus is further caused to:

control the second functional module to remain in a reset state;

control to perform clock gating on the second functional module;

control to perform power gating on the second functional module; or control the second functional module to operate at a dormant operating frequency, wherein the dormant operating frequency is lower than 5% of a standard operating frequency of the second functional module.

18. The apparatus according to claim 16, wherein the apparatus further comprises a first wake-up module, and after the second functional module switches from the operating state to the dormant state, the first wake-up module is configured to:

when the current network includes a resource requirement for the second functional module of the network chip, control the second functional module to switch from the dormant state to the operating state.

19. The apparatus according to claim 16, wherein the apparatus is further caused to:

control the second functional module to switch from the dormant state to the operating state when a failure mode and effect analysis (FMEA) detection periodicity is reached; and control the network chip to perform FMEA detection.

20. A non-transitory computer readable storage medium configured to store computer readable instructions that, when executed by a processor of a device having a service board that includes a network chip, cause the device to provide execution comprising:

determining resource requirement information, of a current network for a plurality of functional modules of the network chip, based on one or more of: port information, configuration information, and traffic information of the network chip, wherein a plurality of first functional modules is a subset of the plurality of functional modules for which the current network has a resource requirement;

determining, based on the resource requirement information of the current network for each first functional module of the network chip, a plurality of target operating frequencies of the network chip, wherein each target operating frequency corresponds to a respective subset of first functional modules; and controlling each subset of first functional modules of the network chip to operate at a corresponding target operating frequency.

* * * * *